United States Patent [19]
Kaye

[11] 3,882,629
[45] May 13, 1975

[54] FISHING ROD SIGNAL LIGHT
[76] Inventor: John A. Kaye, 4363 S. 42nd St., Omaha, Nebr.
[22] Filed: Oct. 9, 1973
[21] Appl. No.: 404,240

[52] U.S. Cl. .......................................... 43/17; 43/25
[51] Int. Cl. ............................................. A01k 97/12
[58] Field of Search .................................. 43/17, 25

[56] References Cited
UNITED STATES PATENTS
| | | | |
|---|---|---|---|
| 2,280,457 | 4/1942 | Sutcliffe | 43/17 |
| 2,302,337 | 11/1942 | Mantell | 43/17 |
| 2,858,636 | 11/1958 | Stipe | 43/25 |

FOREIGN PATENTS OR APPLICATIONS
1,296,452  5/1969  Germany ................................ 43/17

Primary Examiner—Louis G. Mancene
Assistant Examiner—Daniel J. Leach
Attorney, Agent, or Firm—Hiram A. Sturges

[57] ABSTRACT

A fishing light assembly for attachment to fishing rod comprising a casing including a mercury switch, a light bulb and means mounting the casing on a fishing rod in a manner such that bending of the rod when the fish bites causes the switch to deliver current to the bulb from a battery.

13 Claims, 5 Drawing Figures

PATENTED MAY 13 1975  3,882,629
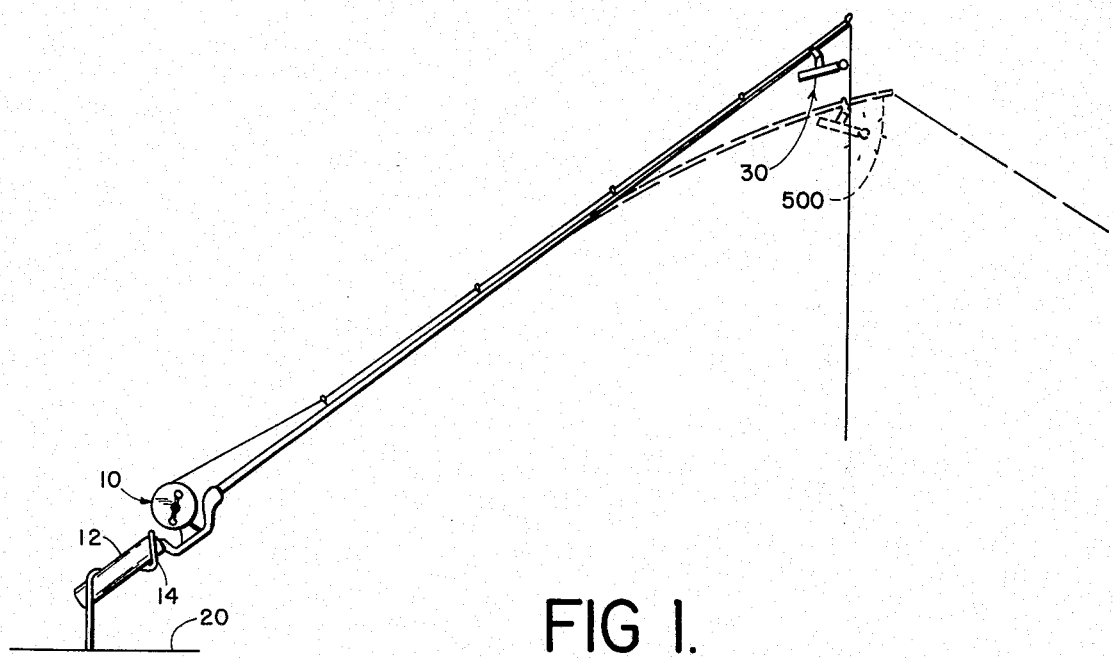
FIG 1.
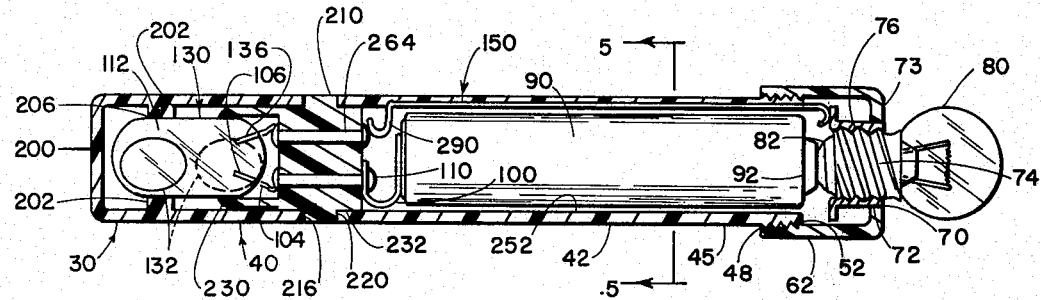
FIG. 2
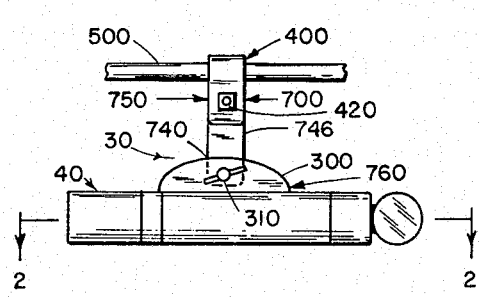
FIG. 3
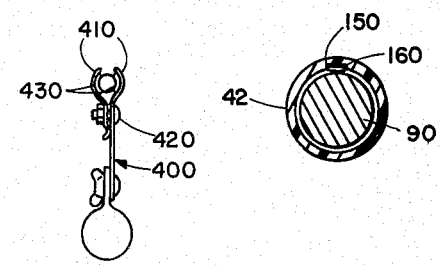
FIG. 4
FIG. 5

FISHING ROD SIGNAL LIGHT

FIELD OF THE INVENTION

This invention is in the field of fishing light assemblies for fishing rods to signal that a fish is biting.

DESCRIPTION OF THE PRIOR ART

Prior art devices for attachment to fishing rods for causing light bulbs to light when a fish bites have generally been of two types. One type is the kind in which the fishing line extends across a movable element controlling a switch, whereby a tightening of the line makes a pressure on the element causing the bulb to light. However, this type has many complications and excessive costs because of the mechanism that is necessary to accomplish this purpose.

The second main type has been signal systems which cause the line to pass under a pressure element between the reel and the forward end of the rod. In such cases, a biting fish makes the line taut enough to pull it out from under the pressure element so that it ceases to hold metallic members apart which then make contact and light a bulb. However, this second main type also has excessive cost.

It is, therefore, an object of this invention to provide a fishing light signal attachment adapted to be mounted to the outer end of a fishing rod so that the bending of the rod itself, at the time a fish bites, is sufficient to cause enough motion to cause the bulb to illuminate. I accomplish this with a tilt-switch, preferably a mercury switch, for economy of construction and dependability in all weather.

I have discovered that there is sufficient bending at the outer end of a rod to make such a signal operate effectively.

In order to control the sensitivity of the light assembly in order to satisfy a fisherman's preferences, the light assembly of my invention is provided with a pivotal connection, making it possible to set the mercury switch in a position so that various amounts of bending of the rod will be sufficient to illuminate the bulb.

Since conceiving my invention, I have discovered through preliminary research that mercury switches have never been used on fishing rods, but that they have been used on fishing bobbers or floats, as is an entirely different application of much less desirability and effectiveness to my mind because of the effect of wave action, and further, much less desirable because a float is at water level, whereas a fisherman may desire to be free to roam about on a shore, carry on conversations by a campfire, and the like, and during such activities, it would be much easier to see a light signal that is mounted up in the air at a substantial height, such as on the upper end of a fishing rod.

I have also discovered that some signal systems have even employed the attachment of the line itself directly to a movable element controlling a switch. This, however, has a disadvantage of the absence of a fishing reel. Any fisherman knows that a fishing reel, with its brake, is very valuable.

A particular objective of this invention is to provide my concept of a casing for carrying a bulb, mercury switch and battery in a manner for economy of manufacture and easy replacement of the battery and bulb.

It is very important that a signal light system be adjustable for fishing for small fish or large fish, such as from one-half pound fish to fish that are 15 pounds or larger. I have conceived of a system giving infinite versatility of adjustment to make this possible.

A particular objective is to provide my concept of a signal device of very light weight to go on the tip of a rod where it is high in the air to be seen from atop a river bank, when it is down by the water's edge, even though the fisherman may be back from the water's edge a substantial distance.

SUMMARY OF THE INVENTION

A fishing light assembly is disclosed for attachment to a fishing rod comprising: a casing, a battery carried by the casing, and a tilt-switch mounted on the casing and controlling current from the battery to a light bulb on the casing, the tilt-switch preferably being a mercury switch, the light bulb and the battery being removable from the casing for replacement, a clamp means being provided for attachment to a fishing rod and being connected to the casing containing the mercury switch by means of an adjustable pivotal connection so that a fisherman can set the exact angle of the fishing rod which will have the effect of causing the bulb to illuminate when a fish bites.

The casing has an integral flange attached to it and forms a part of the pivotal connection for economy of manufacture, the casing having a portion for containing the mercury switch and in which a mercury switch can be first mounted before the general assembly of the product. An intermediate portion can be cemented to the mercury switch-containing casing portion and a battery-containing portion is assembled to the intermediate portion whereby the problem of the removal of the battery is solved by this arrangement of parts and the problem of a firm mounting of a conductive spring member for engaging one of the battery terminals is solved by mounting it on the intermediate member of the casing.

BRIEF DESCRIPTION OF THE DRAWINGS

FIG. 1 is a side elevation of a fishing and signal assembly of this invention showing a rod portion thereof and signal portion thereof in full lines which is the situation before a fish is biting, the same being shown in dotted lines in a position the parts assume after a fish is biting. A holder and holder-mounting means are shown.

FIG. 2 is a sectional view taken along the line 2—2 of FIG. 3.

FIG. 3 is an enlarged detail showing a portion of the fishing rod with the fishing light assembly of this invention attached thereto.

FIG. 4 is a view of the parts shown in FIG. 3 as seen from the right-end thereof.

FIG. 5 is a sectional view taken along the line 5—5 of FIG. 2.

DESCRIPTION OF THE PREFERRED EMBODIMENT

The fishing signal system of this invention is generally indicated at 10 and comprises a fishing rod 12 which can be held in a fishing rod holder 14 attached to or mounted on a boat or the ground as indicated at 20.

In accordance with this invention, a signal light bite signal assembly generally indicated at 30 is provided for the fishing rod.

The bite signal assembly 30 can be seen in FIG. 2 to be formed of a casing 40 having a main portion 42 provided with a hollow interior 252 and preferably being of cylindrical shape on its outer and inner sides and provided with threads around the forward end of its side wall 45. Threads 48 are adapted to receive thereon the threaded inner wall 52 of a cup-shaped forward housing portion 62, which latter has a bulb-mounting member 70 which is metallic and conductive mounted therein and extending through an opening 72 through a forward wall 73 in the forward housing portion 62. Member 70 is annular and has a threaded inner wall 76 adapted to receive the threaded base 74 of an electric bulb 80, which latter has its center contact 82 exposed on the inner side of the forward casing portion 62.

A dry cell battery is shown at 90 in the interior 252 of the casing 40 with its forward contact 92 electrically contacting the contact 82 of the bulb.

The rearward end of the removable battery 90 is pressed forwardly by a resilient metallic spring 100 which is mounted on a bracket 210 fixed to the inside of the casing portion 42 and to which the spring 100 is secured by a conductive metallic rivet 110 extending through the member 210 and having its other end connected by a wire 104 to a terminal 106 which extends into a frame or housing 112 of a mercury switch generally indicated at 130. Switch 130 is elongated forwardly and rearwardly of the elongated casing 40 and has a switch contact bridging element or mercury ball 132 therein which is adapted to place the contact 106 in electrical connection with a second contact 136. Contact 136 also extends through the forward side of the housing 112 and protrudes inwardly, whereby the mercury ball or droplet 132 makes electrical connection between the contacts 106 and 136, but only at times when the forward end of the casing 40 is sufficiently downward tilted, as seen in dotted lines in FIG. 1, when a fish is biting.

A conductor 150 extends from the mercury switch contact 136 by means of conductor 264 forwardly through a notch in the inner side of the rearward casing section 42, the notch being seen at 160 in FIG. 5, whereby the conductor 150 extends forwardly to and is connected to the metallic member 70.

More specifically, the casing 40 has a first casing portion 200 receiving the mercury switch 112. The casing portion 200 is generally of a cup-shape having an inwardly extending annular portion 202 snugly receiving the housing 112 of switch 130, which can also be called a tilt-switch. Housing 112 can be assembled with glue 206 to the first casing portion 200.

A second portion 210 is disposed forwardly of the first casing portion 200 and receives one end thereof in an annular notch 216, whereby a suitable glue is used at 220 to connect the portions 200 and 210 together, the second portion also having a rearwardly extending annular flange 230 for the purpose of receiving therein and supporting the forward end of the housing 112 of the mercury switch 130.

The casing 40 has a second casing portion 42 in which the battery 90 is held supported snugly but slidably by the interior wall 252 thereof. The second casing portion is glued into a notch 232 in the forward side of portion 210. Conductor 150 has at its rearward end a rearward resilient member 290 which engages the forward end of the conductor 264 for electrical contact therewith.

The metallic mounting member 70 connects the conductor 150 with a terminal of the bulb 80.

The third casing portion 250 has a forwardly-to rearwardly extending vertical flange 300 mounted thereon which is attached by means of a thumb screw or wing bolt assembly 310 to a clamp 400, which latter has jaws 410 which can be clamped on the forward end 500 of the fishing rod 12 by means of a set screw 420. The jaws 410 are padded with padding 430 and when the set screw 420 is tightened, the fisherman can regulate the position of tilt of the casing 40 and of the mercury switch housing 112 by adjusting the wing nut and bolt assembly 310 so that a desired amount of bending of the rod will cause the bulb 80 to illuminate in the manner shown in dotted lines in FIG. 1.

All parts of the bite signal assembly 30 shown in FIG. 3, with the exception of the casing 40, can be considered to be an attachment means generally indicated at 700 for adjustably attaching the casing 40 to the rod and having a third attachment means section 740 which is adjustable and which can comprise the lower part 746 of the clamp 400, the flange 300, and the wing bolt assembly 310.

All parts of the bite signal assembly 30 which are disposed above the third attachment means section are herewith called the first attachment means section 750 and the latter is attachable to a rod.

All parts of the bite signal assembly 30 which are disposed between the third attachment means section and the casing 40 are herewith called the second attachment means section 760.

With this terminology, the third attachment means section 740 is adjustable so that by manually varying its adjustment, a fisherman can adjust the angle of tilt of the second attachment means section 760 with respect to the horizontal while holding the first attachment means section 750 in a fixed position with respect to the horizontal.

It will be seen that the attachment means 700 is attached to an upper one-quarter of the fishing rod where the bending is greatest because, as seen in FIG. 1, the thickness of the rod tapers smaller as the upper end is approached from its central portion.

I claim:

1. A bite signal assembly for fishing for attachment to a fishing rod comprising: a casing, a battery carried by said casing, an electrically operated signal means delivering a signal whenever said signal means is electrically energized, and a tilt-switch having a frame mounted on said casing, said tilt-switch having two contacts on said frame, said switch having a bridging element moving by gravity and carried by said frame toward and away from electrical contact with said contacts as said frame is tilted in each of two directions, and means electrically interconnecting said switch contacts, battery, and signal assembly in a manner such that when said casing is tipped in said directions said battery will be placed into and out of electrical connection with said signal means, attachment means for adjustably attaching said casing to a fishing rod having a first section attachable to a fishing rod and a second section attached to said casing and a third section interconnecting said first and second sections, said second section being angularly adjustable relative to said first section at said third section to adjust the angle of tilt of said second section relative to said first section.

2. The fishing light assembly of claim 1 in which said casing has a first casing portion for receiving said switch, a second casing portion attached to said first casing portion, and a third casing portion attached to an opposite side of said second casing portion from said first casing portion, said battery being disposed in said third casing portion, the forward side of said second casing portion having a spring contact means mounted thereon and engaging a terminal of said battery, and a first electrical conductor extending from said spring to one of said switch contacts, a second electrical connection means extending from the other of said switch contacts through said second casing portion.

3. The combination of claim 2 in which said third casing portion is elongated in a forward-to-rearward direction and is provided with a conductor notch therein and extending into the inner wall thereof, said conductor notch being elongated in a forward-to-rearward direction also, a third electrical conductor extending in a forward-to-rearward direction in said conductor notch, and a fourth conductor attached to said third conductor, and said electrical conducting means having a part coneecting said fourth conductor with the terminal of said bulb.

4. The fishing light assembly of claim 3 in which that part of said electrical interconnection means that connects said third conductor with one terminal of said bulb comprises a certain electrically conductive portion of said bulb support means, and an electrically conductive resilient member yieldingly engaging said certain electrically conductive portion of said bulb support means.

5. The bite signal assembly of claim 1 in which said first section is formed of adjustable clamp means adapted to grip a fishing rod.

6. The bite signal assembly of claim 1 in which said signal means comprises an electric light bulb and means mounting said electric bulb on said casing.

7. A bite signal assembly for fishing for attachment to a fishing rod comprising: a casing, a battery carried by said casing, an electrically operated signal means delivering a signal whenever said signal means is electrically energized, and a tilt-switch including a frame mounted on said casing, said tilt-switch having two contacts on said frame, said switch having a bridging element moving by gravity and carried by said frame toward and away from electrical contact with said contacts as said frame is tilted in each of two directions, and means electrically interconnecting said switch contacts, battery, and signal assembly in a manner such that when said casing is tipped in said directions said battery will be placed into and out of electrical connection with said signal means, and in which an attachment means is provided for angularly adjustably attaching said casing to a fishing rod, whereby by varying the adjustment of said adjustment means the angle of tilt of said casing can be adjusted with respect to a fishing rod substantially in a vertical plane while holding the fishing rod still.

8. The bite signal assembly of claim 7 in which said adjustment means is attached to a fishing rod.

9. The bite signal assembly of claim 7 in which said adjustment means is attached to the outer end portion of a fishing rod.

10. The bite signal assembly of claim 7 in which said signal means is a light bulb.

11. The bite signal assembly of claim 1 in which said adjustment means is attached to the outer end portion of a fishing rod.

12. The bite signal assembly of claim 1 in which said tilt-switch is a mercury switch.

13. The bite signal assembly of claim 7 in which said tilt-switch is a mercury switch.

* * * * *